United States Patent [19]

Needham

[11] Patent Number: 4,487,879
[45] Date of Patent: Dec. 11, 1984

[54] FILLED ARYLENE SULFIDE POLYMER COMPOSITIONS CONTAINING (A) GLASS FILTER IN COMBINATION WITH (B) A MINERAL FILLER

[75] Inventor: Donald G. Needham, Ramona, Okla.

[73] Assignee: Phillips Petroleum Company, Bartlesville, Okla.

[21] Appl. No.: 420,437

[22] Filed: Sep. 20, 1982

[51] Int. Cl.³ .......................... C08K 3/40; C08K 3/34; C08K 3/26; C08K 3/30
[52] U.S. Cl. .................................. 524/423; 524/425; 524/449; 524/451; 524/494; 524/505; 524/609; 525/92
[58] Field of Search .................. 525/92; 524/505, 423, 524/425, 449, 451, 494, 609

[56] References Cited

U.S. PATENT DOCUMENTS

| | | | |
|---|---|---|---|
| 3,487,454 | 12/1969 | Oates et al. | 260/900 |
| 3,925,530 | 12/1975 | Rees | 264/297 |
| 3,929,708 | 12/1975 | Brady et al. | 260/29.1 SB |
| 4,020,054 | 4/1977 | Fodor | 524/432 |
| 4,134,874 | 1/1979 | Needham | 260/37 SB |
| 4,176,098 | 11/1979 | Needham | 524/451 |
| 4,247,598 | 1/1981 | Blackwell | 428/419 |
| 4,262,661 | 4/1981 | Needham | 524/609 |
| 4,350,786 | 9/1982 | Blackwell et al. | 524/609 |
| 4,365,037 | 12/1982 | Adachi et al. | 524/609 |

OTHER PUBLICATIONS

Derwent Abst. 80584 D/44 (J56118456) 9-81.
Translated.copy Japanese by PTO of Kokai Patent Public. 56-118456 (9-17-1981) Asahi Kasei.

Primary Examiner—Herbert J. Lilling
Attorney, Agent, or Firm—A. W. Umphlett

[57] ABSTRACT

A filled arylene sulfide polymer composition is provided in which at least 30 weight percent of the total composition is arylene sulfide polymer, up to about 65 weight percent of the total composition is filler material chosen from glass filler and at least one mineral filler and containing a property modifying amount of up to about 12 weight percent of the total composition of a solid, resinous butadiene/styrene block compolymer having the vinyl content in the range of about 10 to about 14 percent based on the polybutadiene segment of the copolymer. The physical characteristics of a filled arylene sulfide polymer composition containing at least 30 weight percent of the total composition of arylene sulfide polymer and up to about 65 weight percent of the total composition of fillers comprising glass fibers and at least one mineral filler are improved by the addition of a property modifying amount of up to about 12 weight percent of the total composition of a solid, resinous butadiene/styrene block copolymer having a vinyl content in the range of about 10 to about 14 percent based on the polybutadiene segment of the copolymer.

10 Claims, No Drawings

FILLED ARYLENE SULFIDE POLYMER COMPOSITIONS CONTAINING (A) GLASS FILTER IN COMBINATION WITH (B) A MINERAL FILLER

BACKGROUND

This invention relates to compositions of matter containing poly(arylene sulfide). In one of its aspects this invention relates to poly(arylene sulfide) compositions containing filler materials. In still another aspect of this invention it relates to poly(arylene sulfide) compositions having fillers chosen from among both glass and mineral fillers. In still another aspect of this invention it relates to poly(arylene sulfide) compositions containing minor amounts of solid, resinous butadiene/styrene block copolymer.

While reviewing various compounds for use as flow improvers with filled arylene sulfide polymer compositions it was discovered that the addition of a minor amount of a solid, resinous butadiene/styrene block copolymer provided a desirable improvement in physical properties of filled poly(arylene sulfide) compositions and allowed replacement of poly(arylene sulfide) with additional mineral filler without sacrifice of commercially desirable physical characteristics thereby providing an economic advantage.

It is therefore an object of this invention to provide economically advantageous compositions based on filled poly(arylene sulfide). It is another object of this invention to improve physical characteristics of filled poly(arylene sulfide) compositions. It is yet another object of this invention to provide agents suitable for improving physical characteristics of filled poly(arylene sulfide) compositions.

Other aspects, objects and the various advantages of this invention will become apparent upon reading the specification and the appended claims.

STATEMENT OF THE INVENTION

According to this invention, a filled arylene sulfide polymer composition is provided in which there is (a) at least 30 weight percent of the total composition of arylene sulfide, (b) up to about 65 weight percent of the total composition of fillers comprising glass filler and at least one mineral filler and (c) a property modifying amount of up to about 12 weight percent of the total composition of a solid, resinous butadiene/styrene block copolymer having a vinyl content of about 10 to about 14 percent based on the polybutadiene segment of the copolymer.

In one embodiment of the invention a method is provided for attaining compositions based on poly(arylene sulfide), glass fillers, and mineral fillers in which physical characteristics are improved by the addition of up to about 12 weight percent of the total composition of a solid, resinous butadiene/styrene block copolymer having a vinyl content in the range of about 10 to about 14 percent based on the polybutadiene segment of the polymer as the butadiene/styrene copolymer-containing composition as compared to similar compositions which lack only the additive copolymer. Compositions from which this method of improvement if applicable are those containing 30 weight percent of the total composition of arylene sulfide polymer and up to about 65 weight percent of the total composition of fillers.

The poly(arylene sulfide) resins, often abbreviated PAS, contemplated in the compositions of this invention include those described in U.S. Pat. No. 3,354,129 and U.S. Pat. No. 3,919,177. The presently preferred polymer is a poly(phenylene sulfide), often abbreviated PPS.

The term poly(arylene sulfide) includes homopolymers and the normally solid arylene sulfide copolymers, terpolymers, and the like having melting or softening points of at least 300° F. (149° C.) and more preferably from about 400° to about 900° F. (200°–482° C.). Other examples of poly(arylene sulfides) are poly(4,4'-biphenylene sulfide), poly(2,4-tolylene), a copolymer of p-dichlorobenzene, 2,4-dichlorotoluene and sodium sulfide and the like. At present, the preferred poly(arylene sulfide) for use in this invention is a poly(phenylene sulfide) that is, at least, partially cured so that it has a melt flow in the range of about 850±100 grams/10 mins.

The glass materials useful in the present invention as fillers can be chosen from any of those products commercially available which generally find use as fillers and reinforcing agents in polymeric blends. These can be chosen from fiberglass or glass beads, for instance, with the preferred material for this invention being glass fiber.

The mineral fillers useful in this invention can be chosen from such materials as calcium carbonate, calcium sulfate, talc, mica, and the like, with the foregoing named substances being the preferred fillers. The mineral fillers should be of small particulate size, preferably in the range such as would pass through a number 325 screen of the U.S. sieve series. Typical of the particle size particularly preferred in this invention would be a calcium sulfate with an average particle size within the range of about 0.5 micron up to about 10 microns preferably having an average particle size in the range of about 0.5 micron up to about 5 microns.

The mineral fillers and glass fillers will be present in the compositions of this invention in a total amount of up to about 65 weight percent of the total composition, preferably in a range of about 55 to about 65 weight percent of the total composition. The ratio of glass filler to mineral filler in the compositions will range from about 1:3 to about 3:1, preferably from about 1:2 to about 2:1.

The solid, resinous butadiene/styrene block copolymer useful in this invention to modify physical properties of the arylene sulfide compositions include those described in U.S. Pat. No. 3,639,517 and U.S. Pat. No. 4,091,053 which are described as produced by the sequential polymeriation of monovinyl-substituted aromatic hydrocarbons in conjugated dienes with multiple additions of initiator and monovinyl-substituted aromatic monomer and subsequently treated with a polyfunctional treating agent to form resinous branched block copolymers which are polymodel in regard to molecular weight distribution. The polymers most preferred for use in this invention are those that have not been hydrogenated as evidenced by vinyl content in a range of up to about 15 percent based on the polybutadiene segment, preferably having a vinyl content in the range of about 10 to about 14 percent based on the polybutadiene segment.

As is usual in polymeric blends based on poly(arylene sulfide) a variety of other additives can be used in minor amounts of up to about 3 percent by weight of the total composition. These additives include such materials as flow improving (processability) agents, silane, and pigments. Processability agents that can be employed in the inventive composition can be selected from among solid ethylene polymers (see U.S. Pat. No. 4,134,874) saturated fatty acid salts such as zinc stearate and the N,N'-alkylene bis(alkanamides), glycerides and phosphated glycerides of saturated fatty acids containing from 10 to 30 carbon atoms, mono- and di-alkanolamides derived from saturated fatty acids and esters derived from a saturated long-chain fatty acid and long-chain saturated aliphatic alcohol. General fillers such as lithium carbonate are also suitable as processability agents.

The mode of mixing or blending compositions useful in the present process include the conventional processes as known in the art. Particularly useful is dry blending using commercial apparatus followed by extrusion and pelleting using commercial apparatus.

The examples following should be taken as exemplary and not exclusive in illustrating the invention. For the examples, dry blends of poly(phenylene sulfide) powder, fiberglass, mineral filler, processing agents and additive polymeric compounds for modifying physical characteristics of the compositions were prepared by mixing in a Henschel mixer at 1000 rpm at ambient temperature (about 23° C.). All components except the glass were mixed for 5 minutes, the glass was added and the composition was mixed an additional 30 seconds. Each blend was further processed by passage through a 46 millimeter extruder and a stock temperature of 600° F. (316° C.) and converted into strands by a die attached to the extruder. The strands were chopped into pellets by rotating knives.

Each composition contained poly(phenylene sulfide) prepared in accordance with U.S. Pat. No. 3,354,129 and thermally precured to a nominal melt flow of 850 g/10 minutes as determined in accordance with ASTM D1238-70 at 316° C. and 5 kg weight; fiberglass designated as grade 497 AA top strands, about ⅛ inch (3.2 mm) in length, obtained from Owens Corning Fiberglass Corporation, Toledo, Ohio; mineral filler chosen from the list set out below; KRO3 ® which is a butadiene/styrene solid, resinous, block copolymer having a vinyl content in a range of about 10 to about 14 percent based on the polybutadiene segment prepared in accordance with U.S. Pat. No. 4,091,053, available from Phillips Petroleum Company and processing agents chosen from lithium carbonate, zinc stearate, polyethylene, and N,N'-ethylene bis stearamide (Acrawax ® C, see footnote to Table III).

The fillers employed are as follows: calcium carbonate, average particle size of 10–15 μM. 99.5 percent through 325 mesh, purchased as No. 10 White from Georgia Marble Company, Tate, Ga.

Calcium sulfate, averge particle size of 1.4 μM, purchased as grade CA-5 from United States Gypson Company, Chicago, Ill.

Talc, medium oil absorption, high brightness general purpose with a Hegman fineness grade of 4, purchased from Whittaker, Clark, and Daniels, Plainfield, N.J. designated as 2620 grade.

Mica, designated as phlogopite flake, purchased from Marietta Resources International Limited, Bethesda, Md.

Solprene ® 512, Phillips Petroleum Co., a 70/30 styrene/butadiene block copolymer having a weight average molecular weight of about 95,000, which has been hydrogenated to essentially eliminate unsaturation.

The test specimens for tensile strength, elongation, flexural modulus and flexural strength, and Izod Impact strength were prepared by injection molding of the pellets in a 2 oz (57 g) machine at a stock temperature of 600° F. and a mold temperature of 275° F. (135° C.).

The test specimens were evaluated according to the following procedures:

tensile (psi) and elongation (%): ASTM D638 type IV bars crosshead speed of 0.5 cm/min flexural modulus (psi) and flexural strength (psi): ASTMD 790

Izod impact strength (ft/lbs/in): ASTM D256 flow rate (g/10 minutes): ASTM D1238-70, 316° C. and 5 kg load spiral flow (in), above described injection molding machine at stock temperature of 615° F. (324° C.), a mold temperature of 200° F. (90° C.), maximum injection speed and a pressure of 18,500 psi (1280 MPa), mold channel depth of 1/16" and width of ¼".

The nature of each composition and the results obtained are presented in the tables below.

TABLE I

| Sample | A (control) | B (invention) | C (control) | D (invention) |
|---|---|---|---|---|
| Formula |  |  |  |  |
| PPS | 35% | 35% | 35% | 30% |
| Fiberglass | 35% | 25% | 25% | 25% |
| CaCO$_3$ | 29% | 34% | 34% | 39% |
| KRO3 | — | 5% | — | 5% |
| Solprene 512 | — | — | 5% | — |
| Processing agents* | 1% | 1% | 1% | 1% |
| Properties |  |  |  |  |
| Tensile Strength (psi) | 13,550 | 13,800 | 12,000 | 12,250 |
| % Elongation | 0.20 | 0.78 | 0.52 | 0.48 |
| Flexural Modulus (psi) | 2,101,000 | 1,648,000 | 1,241,000 | 1,741,000 |
| Flexural Strength (psi) | 21,550 | 20,000 | 16,900 | 19,350 |
| Izod Impact Rt (ft-lb/in) |  |  |  |  |
| Notched | 0.94 | 1.04 | 0.95 | 0.96 |
| Unnotched | 3.44 | 3.87 | 4.12 | 3.46 |
| Heat Distortion (°F.) | >500 | >500 | ** | >500 |
| Spiral Flow (in) | 19 | 24 | 17.5 | 21 |

TABLE I-continued

| Sample | A (control) | B (invention) | C (control) | D (invention) |
|---|---|---|---|---|
| Melt Flow | 75 | 54 | 130 | 50 |

*Processing Agents = .9 wt. % $Li_2CO_3$ and .1 wt. % Zn stearate.
**Not measured The data above generally show that physical characteristics of the inventive compositions B and D compared well with those of control composition A while composition C which contained a hydrogenated butadiene/styrene copolymer as additive instead of the unhydrogenated butadiene/styrene copolymer additive of the present invention had a generally inferior characteristics to the control. Of particular interest in the inventive compositions was the increase in spiral flow as compared with the control which indicates an improved processability of the compositions in the present invention.

TABLE II

| Sample | E (control) | F (control) | G (control) | H (invention) | I (invention) | J (invention) |
|---|---|---|---|---|---|---|
| Formula | | | | | | |
| PPS | 35% | 35% | 35% | 35% | 35% | 35% |
| Fiberglass | 35% | 35% | 35% | 30% | 30% | 30% |
| $CaCO_3$ | 28.9 | — | — | 30.9 | — | — |
| Talc | — | 28.9 | — | — | 30.9 | — |
| Mica | — | — | 28.9 | — | — | 30.9 |
| KRO3 | — | — | — | 3.0 | 3.0 | 3.0 |
| Processing Agents* | 1.1 | 1.1 | 1.1 | 1.1 | 1.1 | 1.1 |
| Properties | | | | | | |
| Tensile Strength (psi) | 15,100 | 15,750 | 18,900 | 15,600 | 14,350 | 17,500 |
| % Elongation | 0.81 | 0.71 | 0.70 | 0.93 | 0.65 | 0.68 |
| Flexural Modulus (psi) | 2,050,000 | 2,230,000 | 2,640,000 | 1,930,000 | 2,050,000 | 2,310,000 |
| Flexural Strength (psi) | 20,800 | 19,400 | 25,200 | 20,900 | 17,700 | 22,800 |
| Izod Impact Rt (ft-lb/in) | | | | | | |
| Notched | 1.0 | .77 | .92 | 1.0 | 0.80 | 0.82 |
| Unnotched | 3.0 | 1.9 | 2.8 | 3.0 | 2.2 | 2.7 |
| Spiral Flow | 17 | 17 | 19 | 24 | 23 | 28 |

*Processing Agents = 1.0 wt. % $Li_2CO_3$ and 0.1 wt. % Zn stearate.

The data in the table above again show that the inventive compositions H, I, and J compare favorably to the control compositions E, F, and G respectively. Again, the increase of spiral flow, here dramatic, indicates an increase of processability of the inventive compositions as compared with the controls.

TABLE III

| Sample | K (control) | L (invention) | M (invention) |
|---|---|---|---|
| Formula | | | |
| PPS | 35% | 33.5 | 31.0% |
| Fiberglass | 35% | 35% | 35% |
| $CaSO_4$ | 28.5 | 28.5 | 28.5 |
| Polyethylene | .25 | .25 | .25 |
| KRO3 | 0 | 2.0 | 5.0 |
| Acrawax C* | 1.0 | 0.5 | — |
| $LiCO_3$ | 1.0 | 1.0 | 1.0 |
| Properties | | | |
| Tensile Strength (psi) | 12,800 | 13,750 | 14,650 |
| % Elongation | 0.40 | 0.51 | 0.50 |
| Izod Impact Rt (ft-lb/in) | | | |
| Notched | .68 | .77 | 1.0 |
| Flexural Mod. (psi) | 2,230,000 | 2,350,000 | 2,270,000 |
| Flexural Strength (psi) | 21,900 | 24,500 | 25,150 |
| Spiral Flow | 25 | 23 | 23 |
| Melt Flow | 195 | 138 | 108 |

*A synthetic wax having a melting point range from 83 to 143° C. from Glyco Chemical Co. used as a processing agent.

The data above indicate that with the addition of progressive amounts of unhydrogenated butadiene/styrene copolymer and using a combination of fiberglass and calcium sulfate as fillers in a poly(arylene sulfide) composition the tensile strength, Izod impact, and flexural strength are all increased. The data also indicate, however, that there is a decrease in spiral flow which indicates a decrease in processability. There is probably an influence on the processability by the decrease in the Acrawax(C) over the three samples which was added to the control as a processing agent.

TABLE IV

| Sample | N (control) | O (control) | P (control) |
|---|---|---|---|
| Formula | | | |
| PPS | 35% | 30% | 30% |
| Fiberglass | 35% | 20% | 20% |
| $CaCO_3$ | 28.75 | 33.75 | 33.75 |
| KRO3 | — | — | 15% |
| Solprene 512 | — | 15% | — |
| Polyethylene | .25 | .25 | .25 |
| Processing Agents* | 1.0 | 1.0 | 1.0 |
| Properties | | | |
| Tensile Strength (psi) | 14,350 | ** | 11,350 |
| % Elongation | .83 | ** | 1.16 |
| Flexural Modulus (psi) | 1,990,000 | — | 1,220,000 |
| Izod Impact Rt (ft-lb/in) | | | |
| Notched | 1.0 | — | .99 |
| Unnotched | 3.5 | — | 3.2 |

TABLE IV-continued

| Sample | N (control) | O (control) | P (control) |
|---|---|---|---|
| Spiral Flow | 18 | >48 | 28 |

*Processing Agents = .9 wt. % LiCO₃ and .1 wt. % Zn stearate.
**Unable to mold test specimens.

The data above indicate that the addition of 15 percent by weight of either Solprene 512 or KRO3 unhydrogenated butadiene/styrene copolymer additive of this invention causes a decided decrease in the characteristics of the compositions based on poly(arylene sulfide) with fiberglass and calcium carbonate filler. There seems, therefore, to be an upper limit to the amount of additive that provides the improvement set out in the present invention.

I claim:

1. A filled arylene sulfide composition comprising
   (a) at least 30 weight percent of the total composition of arylene sulfide polymer,
   (b) up to about 65 weight percent of the total composition of fillers comprising glass filler and at least one mineral filler and
   (c) a property modifying amount of up to about 12 weight percent of the total composition of a solid, resinous butadiene/styrene block copolymer having a vinyl content in a range of about 10 to about 14 percent based on the polybutadiene segment of the polymer.

2. A composition of claim 1 wherein said fillers comprise about 55 to about 65 weight percent of the total composition.

3. A composition of claim 1 or 2 wherein said fillers comprise glass fiber and mineral filler in a ratio of about 1:3 to about 3:1 of glass filler to mineral filler.

4. A composition of claim 1 or 2 wherein said mineral filler is chosen from among calcium carbonate, calcium sulfate, talc, and mica.

5. A composition of claim 3 wherein said mineral filler is chosen from among calcium carbonate, calcium sulfate, talc, and mica.

6. A method for improving physical characteristics of a filled arylene sulfide composition containing at least 30 weight percent of the total composition of arylene sulfide polymer and up to about 65 weight percent of the total composition of fillers comprising glass fillers and at least one mineral filler said method comprising admixing therewith a property modifying amount of up to about 12 weight percent of the total composition of a solid, resinous butadiene/styrene block copolymer having a vinyl content in the range of about 10 to about 14 percent based on the polybutadiene segment of the copolymer.

7. A method of claim 6 wherein said filler is comprised of about 55 to about 65 weight percent of the total composition.

8. A method of claim 6 or 7 wherein said filler is comprised of glass filler and mineral filler in a ratio of about 1:3 to about 3:1 of glass filler to mineral filler.

9. A method of claim 1 or 2 wherein said mineral filler is chosen from among calcium carbonate, calcium sulfate, talc, and mica.

10. A method of claim 8 wherein said mineral filler is chosen from among calcium carbonate, calcium sulfate, talc, and mica.

* * * * *